United States Patent
Sasaki et al.

(10) Patent No.: US 11,899,724 B2
(45) Date of Patent: Feb. 13, 2024

(54) ORDER PRESERVING PATTERN MATCHING APPARATUS, ORDER PRESERVING PATTERN MATCHING METHOD, AND COMPUTER-READABLE MEDIUM STORING PROGRAM

(71) Applicant: NEC Corporation, Tokyo (JP)

(72) Inventors: Yoichi Sasaki, Tokyo (JP); Shiho Sugimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 99 days.

(21) Appl. No.: 17/604,031

(22) PCT Filed: Apr. 19, 2019

(86) PCT No.: PCT/JP2019/016867
§ 371 (c)(1),
(2) Date: Oct. 15, 2021

(87) PCT Pub. No.: WO2020/213164
PCT Pub. Date: Oct. 22, 2020

(65) Prior Publication Data
US 2022/0207089 A1  Jun. 30, 2022

(51) Int. Cl.
*G06F 16/00* (2019.01)
*G06F 16/903* (2019.01)
(Continued)

(52) U.S. Cl.
CPC ........ *G06F 16/90344* (2019.01); *G06F 16/31* (2019.01); *G06F 16/338* (2019.01)

(58) Field of Classification Search
CPC ... G06F 16/90344; G06F 16/338; G06F 16/31
See application file for complete search history.

(56) References Cited

U.S. PATENT DOCUMENTS 3,909,793 A * 9/1975 Handrich .......... G06F 16/90344
340/146.2
3,942,169 A * 3/1976 Fujimoto ............. G06V 10/754
382/224

(Continued)

FOREIGN PATENT DOCUMENTS

JP  H02-73478 A  3/1990
JP  2003-141122 A  5/2003

OTHER PUBLICATIONS

International Search Report for PCT Application No. PCT/JP2019/016867, dated Jul. 16, 2019.

(Continued)

*Primary Examiner* — Alexander Khong

(57) ABSTRACT

An order preserving pattern matching apparatus according to the present invention includes a matching direction pattern conversion unit for setting an ID number for each order preserving type of a character string in a retrieval pattern for a plurality of matching directions including at least one diagonal direction, and generating a list of the ID numbers as a matching direction pattern, an encoding processing unit configured to generate an encoded two-dimensional pattern assigned with a corresponding ID number for a pattern being a part of a two-dimensional pattern to be searched that matches an order preserving pattern assigned with an ID number, and a matching unit configured to perform matching whether an arrangement matching the matching direction pattern assigned with an ID number exists or not within the encoded two-dimensional pattern.

5 Claims, 10 Drawing Sheets

PATTERN MATCHING DIRECTION
IN THE PATTERN MATCHING PROBLEM

CHALLENGES CONCERNING THE ORDER PRESERVING PATTERN MATCHING PROBLEM

EVEN WHEN a < c AND b < c HOLD TRUE,
RELATIONSHIP BETWEEN a AND b IS UNKNOWN BECAUSE RELATIONSHIP
IN DIAGONAL DIRECTION IS NOT CONSIDERED
NOTE THAT IF a < b AND b < c HOLD TRUE, a < c HOLDS TRUE

IN THE ORDER PRESERVING PATTERN MATCHING PROBLEM,
A SEARCH CONSIDERING DIAGONAL DIRECTION IS NECESSARY

(51) Int. Cl.
  *G06F 16/338*  (2019.01)
  *G06F 16/31*  (2019.01)

(56) References Cited

U.S. PATENT DOCUMENTS

| | | | |
|---|---|---|---|
| 10,567,409 B2* | 2/2020 | Zhang | G06N 5/047 |
| 2004/0028133 A1* | 2/2004 | Subramaniyan | H04N 19/57 |
| | | | 375/E7.122 |
| 2005/0078015 A1* | 4/2005 | Ferran | G01D 5/2457 |
| | | | 341/11 |
| 2005/0089111 A1* | 4/2005 | Liou | H04L 5/023 |
| | | | 375/267 |
| 2011/0102533 A1* | 5/2011 | Mikami | B41J 11/42 |
| | | | 347/110 |
| 2011/0320792 A1* | 12/2011 | Bonanno | G06F 9/3806 |
| | | | 712/240 |
| 2018/0270262 A1* | 9/2018 | Zhang | G06N 20/00 |

OTHER PUBLICATIONS

Kim, J., et al., "Order-preserving matching" Theoretical Computer Science, vol. 525, 2014, pp. 68-79.
M. Kubica et al., "A linear time algorithm for consecutive permutation pattern matching" Information Processing Letters, vol. 113, Issue 12, 2014.
T. P. Baker,: A technique for extending rapid exact-match string matching to arrays of more than one dimensions, SIAM J. Comput. vol. 7, No. 4, Nov. 1978, pp. 533-541.
R. S. Bird,: Two dimensional pattern matching, Information Processing Letters, vol. 6, No. 5, Oct. 1977, p. 168.

\* cited by examiner

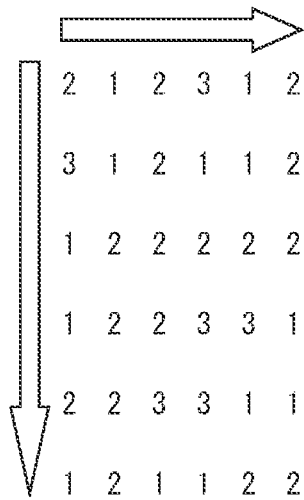

PATTERN MATCHING DIRECTION
IN THE PATTERN MATCHING PROBLEM

CHALLENGES CONCERNING THE ORDER PRESERVING PATTERN MATCHING PROBLEM

EVEN WHEN a < c AND b < c HOLD TRUE,
RELATIONSHIP BETWEEN a AND b IS UNKNOWN BECAUSE RELATIONSHIP
IN DIAGONAL DIRECTION IS NOT CONSIDERED
NOTE THAT IF a < b AND b < c HOLD TRUE, a < c HOLDS TRUE

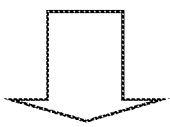

IN THE ORDER PRESERVING PATTERN MATCHING PROBLEM,
A SEARCH CONSIDERING DIAGONAL DIRECTION IS NECESSARY

Fig. 1

```
                    ┌─ RETRIEVAL PATTERN P
           ┌ ─ ─ ─ ─ ┐
         2 │ 1  2  3  1 │ 2
           │            │
         3 │ 1  2  1  1 │ 2
           │            │
         1 │ 2  2  2  2 │ 2
           │            │
         1 │ 2  2  3  3 │ 1
           └ ─ ─ ─ ─ ┘
         2   2  3  3  1   1

1   2  1  1  2   2
```

TWO-DIMENSIONAL PATTERN
TO BE RETRIEVED T

Fig. 3

EXAMPLE OF RETRIEVAL PATTERN P

EXAMPLE OF MATCHING DIRECTION PATTERN M $M1 = \begin{matrix} P101 \\ P102 \\ P103 \\ P104 \end{matrix}$ $M2 = \begin{matrix} P201 \\ P202 \\ P203 \end{matrix}$ $M3 = \begin{matrix} P301 & P304 \\ P302 & P305 \\ P303 & P303 \end{matrix}$ $M7 = P401 \quad P402 \quad P403 \quad P404$ $Mi = \begin{matrix} Pi01 \\ Pi02 \\ Pi03 \end{matrix}$

Fig. 4

$$T = \begin{matrix} 2 & 1 & 2 & 3 & 1 & 2 \\ 3 & 1 & 2 & 1 & 1 & 2 \\ 1 & 2 & 2 & 2 & 2 & 2 \\ 1 & 2 & 2 & 3 & 3 & 1 \\ 2 & 2 & 3 & 3 & 1 & 1 \\ 1 & 2 & 1 & 1 & 2 & 2 \end{matrix} \implies Te = \begin{matrix} 0 & P101 & 0 & 0 & 0 & 0 \\ 0 & P102 & 0 & 0 & 0 & 0 \\ 0 & P103 & P103 & 0 & 0 & 0 \\ 0 & P104 & 0 & 0 & 0 & 0 \\ P104 & 0 & 0 & 0 & 0 & 0 \\ P102 & 0 & 0 & 0 & 0 & 0 \end{matrix}$$

Fig. 6

```
                NUMBER OF MATCHING DIRECTIONS
                     IN X DIRECTION m-1
                ──────────────────────────────▶ a11    a12    · · ·   a1m a21    a22    · · ·   a2m      NUMBER OF MATCHING
                 ·                             DIRECTIONS IN
                 ·                             Y DIRECTION m-1
                 ·
                am1    am2    · · ·   amm      ▼
```

Fig. 9

ORDER PRESERVING PATTERN MATCHING APPARATUS, ORDER PRESERVING PATTERN MATCHING METHOD, AND COMPUTER-READABLE MEDIUM STORING PROGRAM

This application is a National Stage Entry of PCT/JP2019/016867 filed on Apr. 19, 2019, the contents of all of which are incorporated herein by reference, in their entirety.

TECHNICAL FIELD

The present invention relates to an order preserving pattern matching apparatus, an order preserving pattern matching method, and a computer-readable medium storing a program, in particular, to an order preserving pattern matching apparatus, an order preserving pattern matching method, and a computer-readable medium storing a program for solving the Order Preserving Pattern Matching problem of specifying whether or not the sequence of characters in a character string matches magnitude relations of values of the characters.

BACKGROUND ART

In recent years, there has been a growing demand for processing big data such as map data, image data, and POS data such as purchase history. In processing these big data, features being sought are extracted from the data.

Many such data mining techniques for finding features of data have been proposed. These data mining techniques can be grouped into techniques for solving the Pattern Matching (PM) problem of specifying a part of a text that fully matches a pattern and the Order Preserving Pattern Matching (OPPM) problem of specifying a part of a text that has a sequence of characters in a character string which matches the magnitude relations of the values of the characters.

Techniques for solving the Order Preserving Pattern Matching problem as regards one-dimensional data are disclosed in, for instance, NPLs 1 and 2. Further, techniques for solving the Pattern Matching problem as regards two-dimensional data are disclosed in, for instance, NPLs 3 and 4.

CITATION LIST

Non Patent Literature

NPL 1: Kim, J., et al., "Order-preserving matching" Theoretical Computer Science, vol 525, 2014

NPL 2: M. Kubica, T. Kulczynski, J. Radoszewski, W. Rytter, and T. Walen.: A linear time algorithm for consecutive permutation pattern matching. Inf. Process. Lett., 113(12):2014.

NPL 3: T. P. Baker.: A technique for extending rapid exact-match string matching to arrays of more than one dimension, SIAM J. Comput. 7, 1978.

NPL 4: R. S. Bird.: Two dimensional pattern-matching, Info. Proc. Lett. 6, 1977

SUMMARY OF INVENTION

Technical Problem

However, in the aforementioned proposed techniques, there is a problem that the Order Preserving Pattern Matching problem as regards two-dimensional data cannot be solved.

Solution to Problem

An order preserving pattern matching apparatus according to an aspect of the present invention includes:

a matching direction pattern conversion unit configured to set an ID number for each order preserving type for a character string for a plurality of matching directions including at least one diagonal direction in a retrieval pattern composed of text data arranged two-dimensionally, and generate a matching direction pattern as a list of the ID numbers for each matching direction in the retrieval pattern;

an index generation unit for character string matching configured to generate, for the retrieval pattern, as index information, an index which specifies an order preserving pattern being the same as a pattern to which the matching direction pattern conversion unit has assigned the ID number;

an encode processing unit configured to generate an encoded two-dimensional pattern assigned with the corresponding ID number for a pattern being a part of a two-dimensional pattern to be searched that matches the order preserving pattern assigned with the ID number using the index information, the two-dimensional pattern to be searched being composed of text data arranged two-dimensionally and including an array larger than that of the retrieval pattern;

a matching unit configured to perform matching whether an arrangement matching the matching direction pattern assigned with the ID number exists or not within the encoded two-dimensional pattern, using the matching direction pattern in the encoded two-dimensional pattern; and an output unit configured to output a matching position where the matching unit has determined that an arrangement assigned with the ID number matching the matching direction pattern exists.

An order preserving pattern matching method according to an aspect of the present invention includes an order preserving pattern matching method of searching a two-dimensional pattern to be searched composed of text data arranged two-dimensionally for a part thereof that constitutes an order preserving pattern that matches a retrieval pattern composed of text data arranged two-dimensionally, the order preserving pattern matching method including:

setting, for the retrieval pattern, an ID number for each order preserving type for a character string for a plurality of matching directions including at least one diagonal direction and generating a matching direction pattern as a list of the ID numbers for each of the matching directions in the retrieval pattern;

generating, for the retrieval pattern, an index which specifies an order preserving pattern being the same as a pattern to which the ID number is assigned as index information;

generating an encoded two-dimensional pattern assigned with the corresponding ID number for a pattern being a part of the two-dimensional pattern to be searched that matches the order preserving pattern assigned with the ID number using the index information in the two-dimensional pattern to be searched, and a matching unit configured to perform matching whether an arrangement matching the matching direction pattern assigned with the ID number exists or not within the encoded two-dimensional pattern using the matching direction pattern in the encoded two-dimensional pattern; and outputting a position where an arrangement assigned with the ID number that matches the matching direction pattern is determined to exist as a matching position.

A computer-readable medium according to an aspect of the present invention includes:

a computer-readable medium storing an order preserving pattern matching program for causing a computer to perform an order preserving pattern matching process of searching a two-dimensional pattern to be searched that is stored in a database and composed of text data arranged two-dimensionally for a part thereof that constitutes an order preserving pattern that matches a retrieval pattern composed of text data arranged two-dimensionally;

the order preserving pattern matching program causes a computer to perform a matching direction pattern conversion processing of setting an ID number for each order preserving type of a character string in the retrieval pattern for a plurality of matching directions including at least one diagonal direction, and generating a matching direction pattern as a list of the ID numbers for each of the matching directions in the retrieval pattern;

an index generation processing for a character string matching of generating, for the retrieval pattern, an index which specifies an order preserving pattern being the same as a pattern to which the ID number is assigned as index information;

an encoding processing of generating an encoded two-dimensional pattern assigned with the corresponding ID number for a pattern being a part of the two-dimensional pattern to be searched that matches the order preserving pattern assigned with the ID number using the index information in the two-dimensional pattern to be searched;

a matching processing of performing matching whether an arrangement matching the matching direction pattern assigned with the ID number exists or not within the encoded two-dimensional pattern using the matching direction pattern in the encoded two-dimensional pattern; and an output processing of outputting a position where an arrangement assigned with the ID number that matches the matching direction pattern is determined to exist in the matching processing as a matching position.

Advantageous Effects of Invention

According to an order preserving pattern matching apparatus, an order preserving pattern matching method, and a computer-readable medium storing a program, the Order Preserving Pattern Matching problem as regards two-dimensional data can be solved.

BRIEF DESCRIPTION OF DRAWINGS

FIG. 1 is a diagram for explaining the challenges related to the Order Preserving Pattern Matching problem as regards two-dimensional data.

FIG. 3 is a diagram illustrating a relation between a two-dimensional pattern to be searched and a retrieval pattern that are processed by the order preserving pattern matching apparatus according to the first example embodiment.

FIG. 4 is a diagram illustrating processing of a matching direction pattern conversion unit of the order preserving pattern matching apparatus according to the first example embodiment.

FIG. 6 is a diagram illustrating processing of a text encoding unit of the order preserving pattern matching apparatus according to the first example embodiment.

FIG. 9 is a diagram illustrating the number of matching directions in a retrieval pattern.

DESCRIPTION OF EMBODIMENTS

First Embodiment

Hereinbelow, example embodiments of the present invention will be described with reference to the drawings. First, the Order Preserving Pattern Matching problem as regards a two-dimensional pattern to be processed by an order preserving pattern matching apparatus 1 according to a first example embodiment will be explained. A diagram for explaining the challenges related to the Order Preserving Pattern Matching problem as regards two-dimensional data is shown in FIG. 1.

In FIG. 1, the top diagram shows the matching direction of data in the Pattern Matching problem as regards two-dimensional data indicated in the aforementioned NPLs 3 and 4. As shown in the top diagram of FIG. 1, in the Pattern Matching problem as regards two-dimensional data, that is, the Pattern Matching problem as regards data arranged two-dimensionally, a retrieval pattern can be searched when the data matches the matching pattern in two directions of a horizontal direction (e.g., the X-direction) and a vertical direction (e.g., the Y-direction). This is because, in the Pattern Matching problem, the relationship with a=c is compensated if a=b and b=c hold true, whereby the pattern does not need to be searched in the diagonal direction thereof.

The bottom diagram of FIG. 1 shows the challenges concerning the Order Preserving Pattern Matching problem as regards two-dimensional data. In the Order Preserving Pattern Matching problem as regards two-dimensional data, unlike in the Pattern Matching problem, a target of retrieval is magnitude relations of the values of the characters in the arranged character string. Therefore, a problem arises when the pattern is searched without considering a relationship among character strings in a diagonal direction of the pattern. Specifically, when the pattern is not searched in the diagonal direction thereof, there is a problem that a magnitude relation of a and b is unknown even if a<c and b<c hold true. On the other hand, the relationship of a<c is compensated if a<b and b<c hold true. As described above, in the Order Preserving Pattern Matching problem as regards two-dimensional data, there is a problem that it is not possible to compensate whether the pattern to be retrieved matches the search pattern unless the pattern to be retrieved is searched for a part thereof in the diagonal direction that matches the search pattern.

Figure 2:
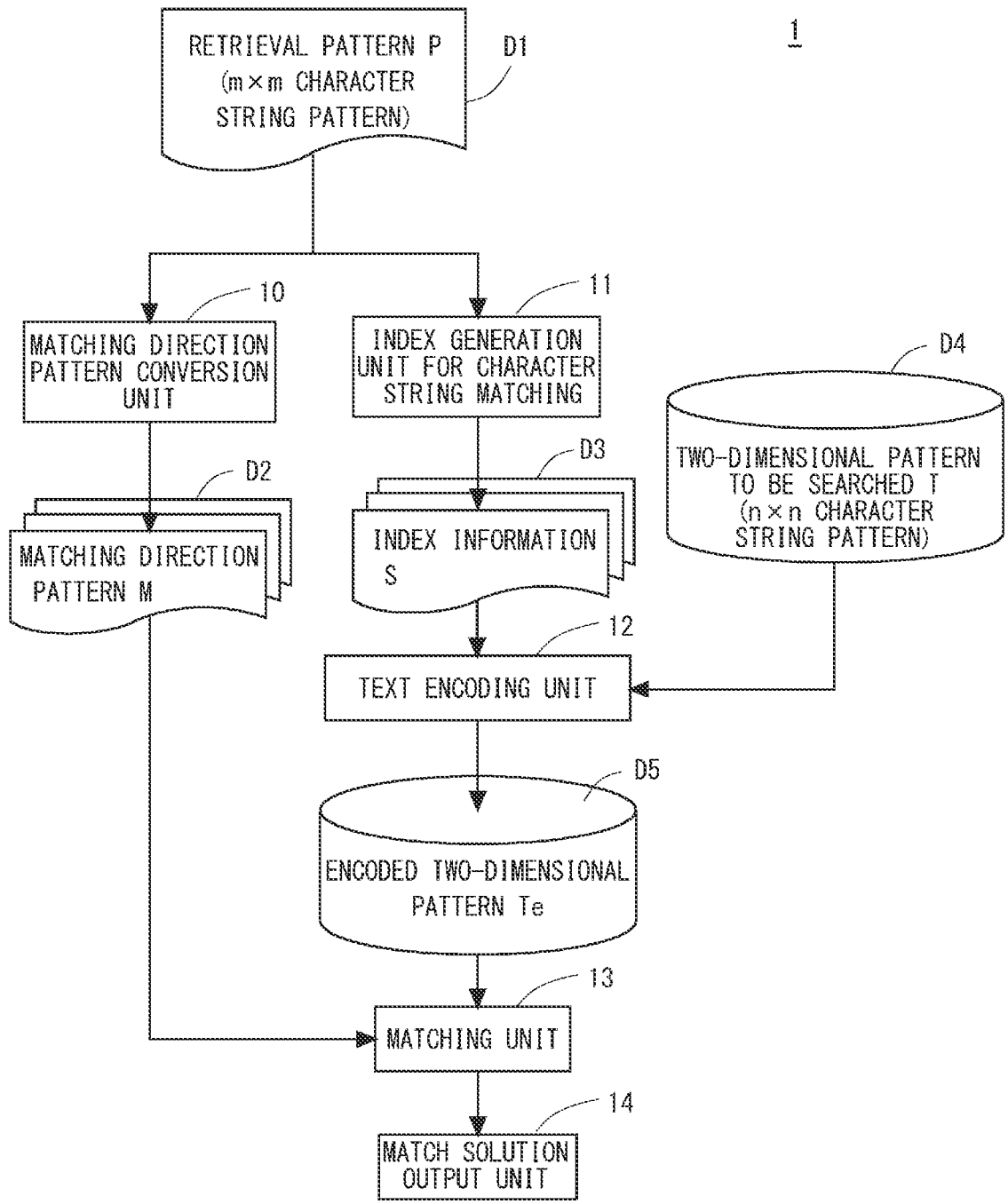
FIG. 2 is a block diagram illustrating a configuration of an order preserving pattern matching apparatus according to a first example embodiment.

Now, the order preserving pattern matching apparatus 1 according to the first example embodiment performs a pattern matching that takes the diagonal direction into consideration. A block diagram illustrating a configuration of the order preserving pattern matching apparatus 1 according to the first example embodiment is shown in FIG. 2. Note that in the configuration shown in FIG. 2, each processing performed by the order preserving pattern matching apparatus 1 is represented by a block, and the content of the processing represented by each block can be realized by exclusive hardware, software implemented by a computer, or the like. In the following description, an example in which the processing is performed by a software implemented by a computer will be described.

The order preserving pattern matching apparatus 1 according to the first example embodiment loads a retrieval pattern P as a file D1 and a two-dimensional pattern to be searched T stored in a two-dimensional-pattern-to-be-searched database D4 is searched for a part thereof that matches the retrieval pattern P. Now, a diagram illustrating a relation between a two-dimensional pattern to be searched and a retrieval pattern that are processed by the order preserving pattern matching apparatus according to the first example embodiment is shown in FIG. 3. As illustrated in FIG. 3, both the retrieval pattern P and the two-dimensional pattern to be searched T are composed of text data arranged two-dimensionally. Further, the two-dimensional pattern to be searched T includes a two-dimensional array pattern that is larger than the retrieval pattern P. When pattern size of the retrieval pattern P is m×m and pattern size of the two-dimensional pattern to be searched T is n×n, a relationship of m<n holds true. In the example shown in FIG. 3, the two-dimensional pattern to be searched T has a part thereof that matches the retrieval pattern P.

Now, refer to FIG. 2. As shown in FIG. 2, the order preserving pattern matching apparatus 1 according to the first example embodiment includes, as processing blocks, a matching direction pattern conversion unit 10, an index generation unit for character string matching 11, a text encoding unit 12, a matching unit 13, and an output unit (e.g., a match solution output unit 14).

A matching direction pattern conversion unit 10 performs a matching direction pattern conversion processing of setting an ID number for each order preserving type of a character string for a plurality of directions including at least one diagonal direction, and generating a matching direction pattern M as a list of the ID numbers for each direction in the retrieval pattern P. With reference to FIG. 4, processing of the matching direction pattern conversion unit 10 will be described more in detail.

FIG. 4 is a diagram illustrating the processing of the matching direction pattern conversion unit of the order preserving pattern matching apparatus according to the first example embodiment. In FIG. 4, processing of generating a matching direction pattern M for the retrieval pattern P illustrated in FIG. 3 is described. As illustrated in FIG. 4, the matching direction pattern conversion unit 10 generates a matching direction pattern M for each matching direction of all possible matching directions within the retrieval pattern P.

In the example illustrated in FIG. 4, a matching direction pattern is illustrated as a matching direction pattern M1 in which a search is performed in a side direction, row by row, from furthest left to furthest right of the retrieval pattern P. Since an order preserving pattern for each of the rows is all different in the matching direction pattern M1, a different ID number for an order preserving pattern is generated for each row.

Further, in the example illustrated in FIG. 4, a matching direction pattern is illustrated as a matching direction pattern M2 in which a search is performed from a text on furthest left of a kth row to a text on furthest right of a (k+1)th row of the retrieval pattern P. Since an order preserving pattern for each of the rows is all different in the matching direction pattern M2, a different ID number for an order preserving pattern is generated for each row. Further, the matching direction pattern M2 has a fewer number of rows than the number of rows in the retrieval pattern P. This is because the last row of the retrieval pattern P does not have a text in the matching direction.

Further, in the example illustrated in FIG. 4, a matching direction pattern is illustrated as a matching direction pattern M3 in which a search is performed from an ith text of a kth row to an (i+2)th text of a (k+1)th row of the retrieval pattern P. In the matching direction pattern M3, since an order preserving pattern (2, 3) in a direction from a 1st column of a 3rd row to a 3rd column of a 4th row and an order preserving pattern (2, 3) in a direction from a 2nd column of a 3rd row to a 4th column of a 4th row match, ID numbers assigned to each of the corresponding positions in the matching direction pattern M3 are identical. Further, the matching direction pattern M3 has a fewer number of rows and columns than the number of rows and columns in the retrieval pattern P.

As described above, the matching direction pattern conversion unit 10 generates matching direction patterns Mi (i is an integer showing the number of matching direction patterns) for all possible directions within the array of the retrieval pattern P.

The index generation unit for character string matching 11 generates an index for the retrieval pattern P, as index information S, that specifies an order preserving pattern being the same as a pattern to which an ID number is assigned by the matching direction pattern conversion unit 10. The index information S is an automaton constituted by branches that branch based on a magnitude relation of consecutive values, for example. Now, an example of an automaton generated by the index generation unit for character string matching 11 will be described below.

Figure 5:
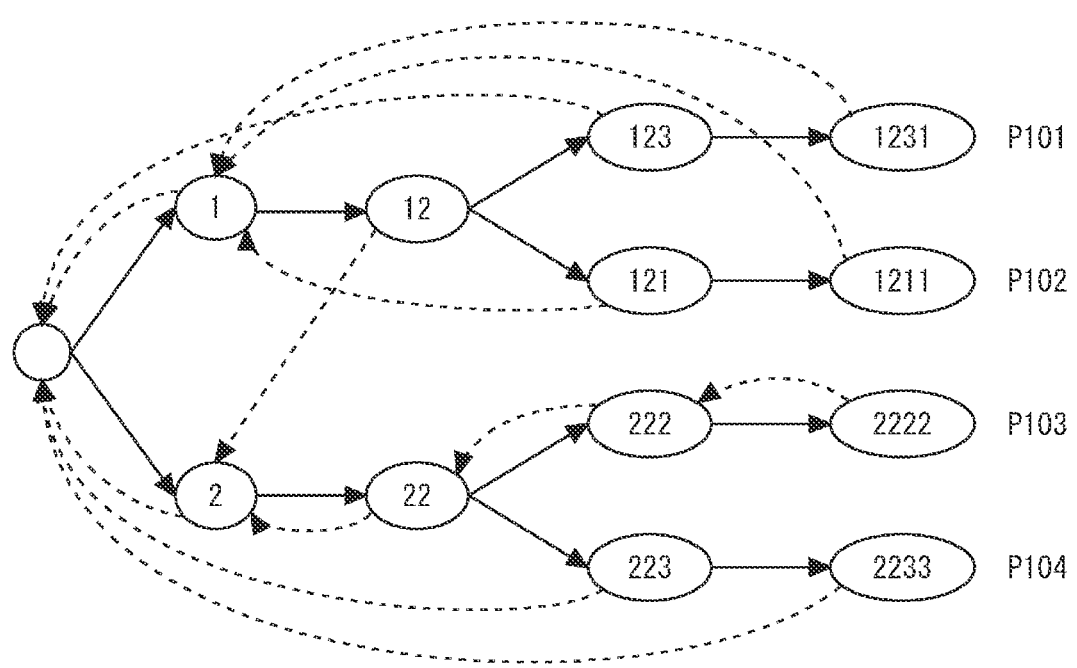
FIG. 5 is a diagram illustrating processing of an index generation unit for character string matching of the order preserving pattern matching apparatus according to the first example embodiment.

FIG. 5 is a diagram illustrating processing of an index generation unit for character string matching of the order preserving pattern matching apparatus according to the first example embodiment. The example illustrated in FIG. 5 is the index information S corresponding to the matching direction pattern M1 described with reference to FIG. 4.

As illustrated in FIG. 5, in the index information S corresponding to the matching directions of the matching direction pattern M1, first branches are 1 or 2 because first characters of ID numbers P101, P102, P103 and P104 in the matching direction pattern M1 are 1 or 2. Then, since second characters in all of the ID numbers P101 to P104 are 2, an only candidate character following the first 1 is 2.

Next, for the ID numbers P101 and P102 whose combination of a first character and a second character is 12, third characters are 3 or 1. Therefore, a branching of the index information S for the ID numbers P101 and P102 whose combination of the first character and second character is 12 becomes 3 or 1. Further, for the ID numbers P103 and P104 whose combination of a first character and a second character is 22, third characters are 2 or 3. Therefore, a branching of the index information S for the ID numbers P103 and P104 whose combination of the first character and the second character is 22 becomes 2 or 3.

Next, the branching corresponding to the ID number P101 is formed in such a way that a connection from 123 forms 1231 without branching. Further, the branching corresponding to the ID number P102 is formed in such a way that a connection from 121 forms 1211 without branching. The branching corresponding to the ID number P103 is formed in such a way that a connection from 222 forms 2222 without branching. The branching corresponding to the ID number P104 is formed in such a way that a connection from 223 forms 2233 without branching.

In the index information S, a returning destination is set which is used for returning when each state of the automaton does not match. In FIG. 5, the setting of the returning destination is illustrated with a dashed arrow. Further, the index generation unit for character string matching 11 generates the index information S for each matching direction of all possible matching directions in the retrieval pattern P.

The text encoding unit 12 generates an encoded two-dimensional pattern assigned with the corresponding ID number for a pattern being a part of a two-dimensional pattern to be searched that matches the order preserving pattern assigned with the ID number using the index information S in the two-dimensional pattern to be searched T. With reference to FIG. 6, processing of the text encoding unit 12 will be described more in detail.

FIG. 6 is a diagram illustrating the processing of a text encoding unit 12 of the order preserving pattern matching apparatus 1 according to the first example embodiment. As illustrated in FIG. 6, the text encoding unit 12 converts the two-dimensional pattern to be searched T on a left side of the diagram to an encoded two-dimensional pattern Te on a right side of the diagram. Specifically, the text encoding unit 12 compares the index information S illustrated in FIG. 5 with the two-dimensional pattern to be searched T, starting from the search start character being the character on a 1st column and a 1st row thereof to a matching direction, and determines whether an array starting from the reference start character matches an order preserving pattern to which the matching direction pattern conversion unit 10 assigned an ID number or not. Then, the text encoding unit 12 performs encoding processing by applying the index information S, sequentially changing the search start character from the 1st column and 1st row, proceeding to the column direction. After encoding a last row in the column direction, in the next column, the text encoding unit 12 moves the search start character in the column direction and performs the encoding processing to all the character strings that can be searched (the character string up to the 3rd column in the example of FIG. 6).

Now, a specific example of the encoding processing of applying the index information S to the two-dimensional pattern to be searched T will be described. When performing a search with a search start character at a 1st row and 1st column in the two-dimensional pattern to be searched T in FIG. 6 in a direction being the same as that of the matching direction pattern M1 (for example, a direction in the row direction), a character string of the two-dimensional pattern to be searched T is 2123. Then, the index information S corresponding to the matching direction pattern M1 does not have a path corresponding to 2123. Therefore, a 1st row and a 1st column of an encoding result of an encoded two-dimensional pattern Te is 0.

As another example, when performing a search with the search start character of a 1st row and a 5th column in the two-dimensional pattern to be searched T in a direction being the same as that of the matching direction pattern M1, a character string of the two-dimensional pattern to be searched T is 2233. Then, in the index information S corresponding to the matching direction pattern M1, a path corresponding to 2233 is associated with an ID number P104. Therefore, a 1st row and a 5th column of the encoding result of the encoded two-dimensional pattern Te is the ID number P104.

The text encoding unit 12 generates the encoded two-dimensional pattern Te corresponding to the matching direction pattern M1 by performing the encoding processing described above. The text encoding unit 12 generates the number of encoded two-dimensional patterns Te corresponding to the number of matching direction patterns M.

Figure 7:
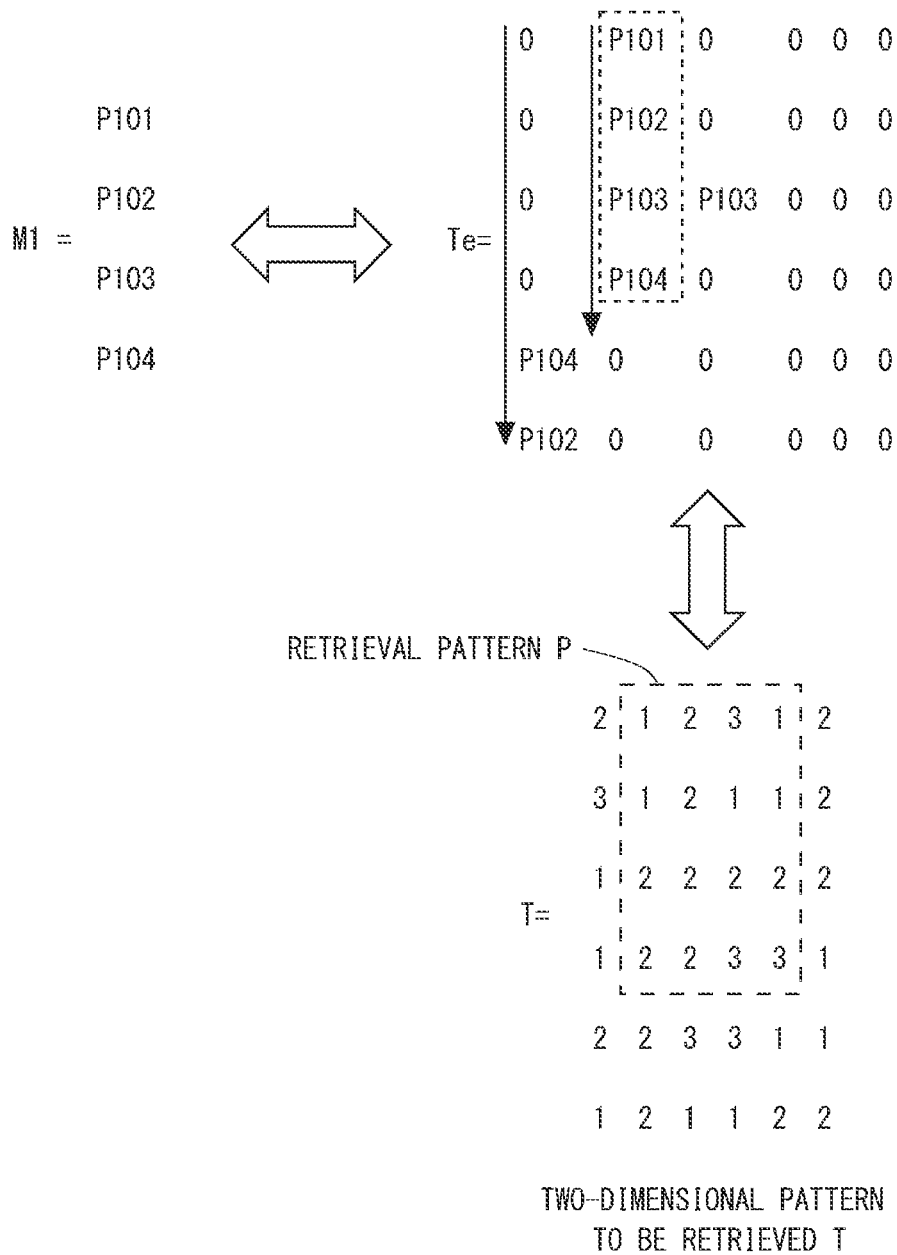
FIG. 7 is a diagram illustrating processing of a matching unit and a match solution output unit of the order preserving pattern matching apparatus according to the first example embodiment.

Next, the matching unit 13 will be described. The matching unit 13 performs matching whether an arrangement matching the arrangement of ID numbers in the matching direction pattern M exists or not within the encoded two-dimensional pattern Te, using the matching direction pattern M in the encoded two-dimensional pattern Te. The match solution output unit 14 outputs a matching position where the matching unit determined an arrangement of ID numbers that matches the matching direction pattern M exists. With reference to FIG. 7, processing of the matching unit 13 and the match solution output unit 14 will be described more in detail.

FIG. 7 is a diagram illustrating the processing of the matching unit 13 and the match solution output unit 14 of the order preserving pattern matching apparatus 1 according to the first example embodiment. As illustrated in FIG. 7, the matching unit 13 performs searching for a place where the arrangement of ID numbers in the encoded two-dimensional pattern Te matches the arrangement of the ID numbers in the matching direction pattern M, by shifting the matching direction pattern M with respect to the encoded two-dimensional pattern Te, and by shifting the position at which the position where the matching direction pattern M is superimposed on the encoded two-dimensional pattern Te.

In the example illustrated in FIG. 7, the match solution output unit 14 refers to a place within the encoded two-dimensional pattern Te where an arrangement of ID numbers matches the matching direction pattern M1, specifies a place in the two-dimensional pattern to be searched T that matches the retrieval pattern P, and outputs the specified position externally. In the example illustrated in FIG. 7, the match solution output unit 14 outputs a range of 4 columns and 4 rows starting from the 1st row and 2nd column of the two-dimensional pattern to be searched T as the position where the retrieval pattern P exists. The matching unit 13 and the match solution output unit 14 specify places in the two-dimensional pattern to be searched T that match all of the matching direction patterns M by using encoded two-dimensional patterns Te and matching direction patterns M for all directions of matching directions derived from the array of the retrieval pattern P, and output the specified places as the position of the retrieval pattern P in the two-dimensional pattern to be searched T.

According to the aforementioned description, the Order Preserving Pattern Matching problem as regards two-dimensional data to be processed can be solved by the order preserving pattern matching apparatus 1 according to the first example embodiment. The number of calculations O of the order preserving pattern matching processing by the order preserving pattern matching apparatus 1 according to the first example embodiment is $O(m2n2)$, where m is the number of characters in one direction of the retrieval pattern P, and n is the number of characters in one direction of the two-dimensional pattern to be searched T.

Second Embodiment

In the second example embodiment, an order preserving pattern matching apparatus 2 which is a variation of the order preserving pattern matching apparatus 1 according to the first example embodiment will be explained. In a description of the second example embodiment, a component that is described in the first example is assigned with the same reference number as that of the first example embodiment, and a description thereof is omitted.

Figure 8:
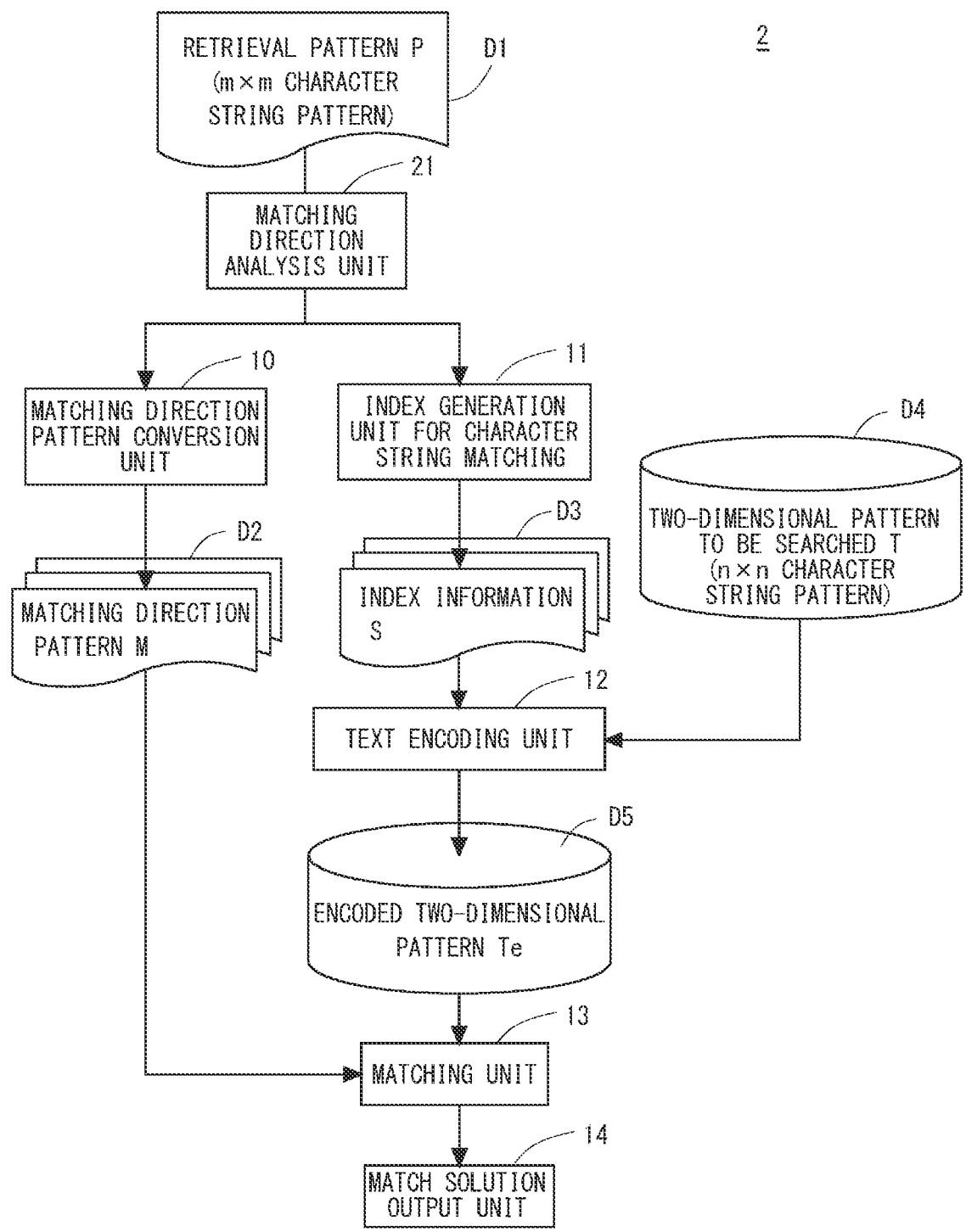
FIG. 8 is a block diagram illustrating a configuration of an order preserving pattern matching apparatus according to a second example embodiment.

A block diagram illustrating a configuration of the order preserving pattern matching apparatus 2 according to the second example embodiment is shown in FIG. 8. As illustrated in FIG. 8, the order preserving pattern matching apparatus 2 according to the second example embodiment is configured by adding a matching direction analysis unit 21 to the order preserving pattern matching apparatus 1. The matching direction analysis unit 21 analyzes a minimum number of matching directions that compensates the order preserving of the retrieval pattern P, and outputs matching direction information representing the matching direction derived by the analysis.

Then, the matching direction pattern conversion unit 10 and the index generation unit for character string matching 11 determine a matching direction in which a matching direction pattern M and index information S are generated, based on the matching direction information generated by the matching direction analysis unit 21. In other words, in the second example embodiment, the matching direction pattern M and the index information S are generated only in the matching direction analyzed by the matching direction analysis unit 21.

Now, an analysis method of a matching direction by the matching direction analysis unit 21 will be described. FIG. 9 is a diagram illustrating the number of matching directions in a retrieval pattern. As illustrated in FIG. 9, the number of matching directions in a retrieval pattern P of m×m is m−1 in an X direction, m−1 in a Y direction. In order to precisely calculate a total number of matching directions of the retrieval pattern P, since only matching directions whose absolute values of a horizontal direction and a vertical direction are relatively prime need to be considered, the number of matching directions Q can be expressed by equation (1).

$$Q(m^2) = (4 \times \Sigma_{k=1}^{m-1} \Phi(k)) + 2 \qquad (1)$$

Where $\Sigma_{k=1}^{m-1} \Phi(k) < m^2$

Figure 10:
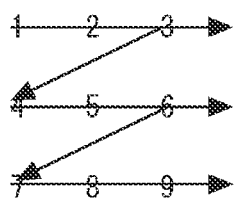
FIG. 10 is a diagram illustrating processing of a matching direction analysis unit of the order preserving pattern matching apparatus according to the second example embodiment.

As described above, the number of matching directions Q becomes large as expressed in equation (1) when all matching directions are considered, however, in the retrieval pattern P, the order preserving pattern can be compensated by matching directions fewer than the number expressed in equation (1). FIG. 10 is a diagram illustrating the processing of a matching direction analysis unit of the order preserving pattern matching apparatus 2 according to the second example embodiment.

An example in FIG. 10 illustrates a retrieval pattern P in a size of 3×3. In the retrieval pattern P, 1 to 3 are arranged in order from left to right in a first row, 4 to 6 are arranged in order from left to right in a second row, and 7 to 9 are arranged in order from left to right in a third row. With this retrieval pattern P, for example, even when an order preserving pattern in a direction toward 9 starting with 1 does not exist, there is a relationship (transitivity rule) that if a<b and b<c hold true, then a<c holds true. More particularly, when two directions in order preserving patterns that are order preserving patterns in a horizontal direction starting with 1, 4, and 7 and order preserving patterns in a direction from 3 to 4 and from 6 to 7 are saved, the aforementioned transitivity rule is compensated.

Therefore, the matching direction analysis unit 21 analyzes matching directions that can compensate the transitivity rule that a<c holds true if a<b and b<c hold true. In the example illustrated in FIG. 10, the number of matching directions Q calculated by equation (1) is 9, however, the number of matching directions that satisfies the transitivity rule is 2.

According to the aforementioned description, the number of calculations required for calculating a solution to the Order Preserving Pattern Matching problem can be reduced by using the matching direction analysis unit 21 of the order preserving pattern matching apparatus 2 according to the second example embodiment. Note that the number of calculations by the order preserving pattern matching apparatus 2 according to the second embodiment reaches a maximum number of O(m2n2) in order to calculate a solution for an Order Preserving Pattern Matching problem. However, a provability that the retrieval pattern P reaches the maximum number of matching directions to compensate the transitivity rule is very small, and therefore an effect of reducing the number of calculations by using the order preserving pattern matching apparatus 2 is significant.

Note that the present invention is not limited to the example embodiments described above can be modified as appropriate without departing from the gist of the present invention.

In the examples described above the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

REFERENCE SIGNS LIST

1 ORDER PRESERVING PATTERN MATCHING APPARATUS
2 ORDER PRESERVING PATTERN MATCHING APPARATUS
10 MATCHING DIRECTION PATTERN CONVERSION UNIT
11 INDEX GENERATION UNIT FOR CHARACTER STRING MATCHING
12 TEXT ENCODING UNIT
13 MATCHING UNIT
14 MATCH SOLUTION OUTPUT UNIT
21 MATCHING DIRECTION ANALYSIS UNIT
P RETRIEVAL PATTERN
T TWO-DIMENSIONAL PATTERN TO BE SEARCHED
Te ENCODED TWO-DIMENSIONAL PATTERN
M MATCHING DIRECTION PATTERN
S INDEX INFORMATION
D1 FILE

D2 FILE
D3 FILE
D4 TWO-DIMENSIONAL-PATTERN-TO-BE-SEARCHED DATABASE
D5 ENCODED TWO-DIMENSIONAL PATTERN DATABASE

The invention claimed is:

1. An order preserving pattern matching apparatus comprising:
  one or more processors; and
  a memory storing program code executable by the one or more processors to:
  for each of a plurality of matching directions in a retrieval pattern, set an ID number for each of a plurality of order preserving types of a character string for the matching direction, the retrieval pattern composed of text data arranged two-dimensionally, the plurality of matching directions including at least one diagonal direction;
  for each matching direction in the retrieval pattern, generate a matching direction pattern as a list of ID numbers that include the ID number for each order preserving type of the character string for the matching direction;
  for the matching direction pattern for each matching direction, generate as index information for the retrieval pattern an index specifying an order preserving pattern for the list of ID numbers for the matching direction pattern;
  for an input two-dimensional pattern, generate an encoded two-dimensional pattern corresponding to the input two-dimensional pattern using the index for the matching direction pattern for each matching direction, the encoded two-dimensional pattern including each ID number of the list of ID numbers for the matching direction pattern, the input two-dimensional pattern composed of text data arranged two-dimensionally and including an array larger than that of the retrieval pattern;
  for the matching direction pattern for each matching direction, determine whether an arrangement matching the list of ID numbers for the matching direction pattern exists or not within the encoded two-dimensional pattern; and
  for the matching direction pattern for each matching direction for which the arrangement matching the list of ID numbers for the matching direction pattern exists, output a matching position where the arrangement exists, wherein
  index information is an automaton constituted by branches that branch based on a magnitude relation of consecutive values, and
  usage of the index information improves data mining by providing for order preservation during search of the input two-dimensional pattern.

2. The order preserving pattern matching apparatus according to claim 1, wherein the program code is executable by the processor to further analyze a minimum number of matching directions that compensates order preserving of the retrieval pattern, and output matching direction information representing the matching direction derived thereby,
  wherein the matching direction pattern is generated for the matching direction represented by the matching direction information, and
  the index information is generated for the matching direction represented by the matching direction information.

3. The order preserving pattern matching apparatus according to claim 1, wherein the matching direction pattern is generated for every arrangement direction of the character string in the retrieval pattern, and
  the index information is generated for every arrangement directions.

4. An order preserving pattern matching method comprising:
  for each of a plurality of matching directions in a retrieval pattern, setting, by a processor, an ID number for each of a plurality of order preserving types of a character string for the matching direction, the retrieval pattern composed of text data arranged two-dimensionally, the plurality of matching directions including at least one diagonal direction;
  for each matching direction in the retrieval pattern, generating, by a processor, a matching direction pattern as a list of ID numbers that include the ID number for each order preserving type of the character string for the matching direction;
  for the matching direction pattern for each matching direction, generating, by the processor, as index information for the retrieval pattern an index specifying an order preserving pattern for the list of ID numbers for the matching direction pattern;
  for an input two-dimensional pattern, generating, by the processor, an encoded two-dimensional pattern corresponding to the input two-dimensional pattern using the index for the matching direction pattern for each matching direction, the encoded two-dimensional pattern including each ID number of the list of ID numbers for the matching direction pattern, the input two-dimensional pattern composed of text data arranged two-dimensionally and including an array larger than that of the retrieval pattern;
  for the matching direction pattern for each matching direction, determining, by the processor, whether an arrangement matching the list of ID numbers for the matching direction pattern exists or not within the encoded two-dimensional pattern; and
  for the matching direction pattern for each matching direction for which the arrangement matching the list of ID numbers for the matching direction pattern exists, outputting, by the processor, a matching position where the arrangement exists, wherein
  index information is an automaton constituted by branches that branch based on a magnitude relation of consecutive values, and
  usage of the index information improves data mining by providing for order preservation during search of the input two-dimensional pattern.

5. A non-transitory computer-readable medium storing an order preserving pattern matching program executable by a computer to perform:
  for each of a plurality of matching directions in a retrieval pattern, setting an ID number for each of a plurality of order preserving types of a character string for the matching direction, the retrieval pattern composed of text data arranged two-dimensionally, the plurality of matching directions including at least one diagonal direction;
  for each matching direction in the retrieval pattern, generating a matching direction pattern as a list of ID numbers that include the ID number for each order preserving type of the character string for the matching direction;

for the matching direction pattern for each matching direction, generating as index information for the retrieval pattern an index specifying an order preserving pattern for the list of ID numbers for the matching direction pattern;

for an input two-dimensional pattern, generating an encoded two-dimensional pattern corresponding to the input two-dimensional pattern using the index for the matching direction pattern for each matching direction, the encoded two-dimensional pattern including each ID number of the list of ID numbers for the matching direction pattern, the input two-dimensional pattern composed of text data arranged two-dimensionally and including an array larger than that of the retrieval pattern;

for the matching direction pattern for each matching direction, determining whether an arrangement matching the list of ID numbers for the matching direction pattern exists or not within the encoded two-dimensional pattern; and for the matching direction pattern for each matching direction for which the arrangement matching the list of ID numbers for the matching direction pattern exists, outputting a matching position where the arrangement exists, wherein index information is an automaton constituted by branches that branch based on a magnitude relation of consecutive values, and usage of the index information improves data mining by providing for order preservation during search of the input two-dimensional pattern.

* * * * *